Dec. 26, 1933.  S. J. SCHWEGLER  1,941,191
PREPAYMENT METER
Filed Feb. 11, 1932  4 Sheets-Sheet 1

INVENTOR
Siegfried J. Schwegler
BY
ATTORNEY.

Dec. 26, 1933.  S. J. SCHWEGLER  1,941,191
PREPAYMENT METER
Filed Feb. 11, 1932  4 Sheets-Sheet 2
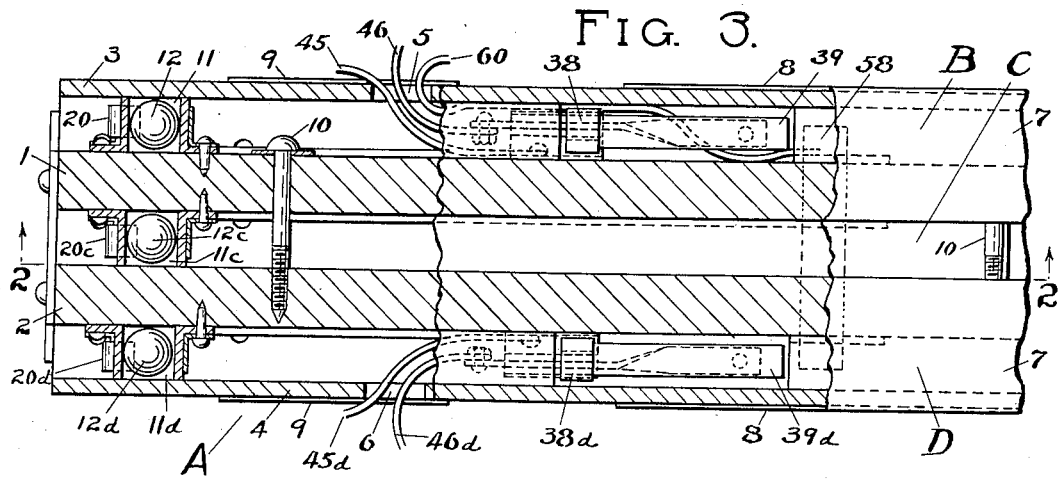
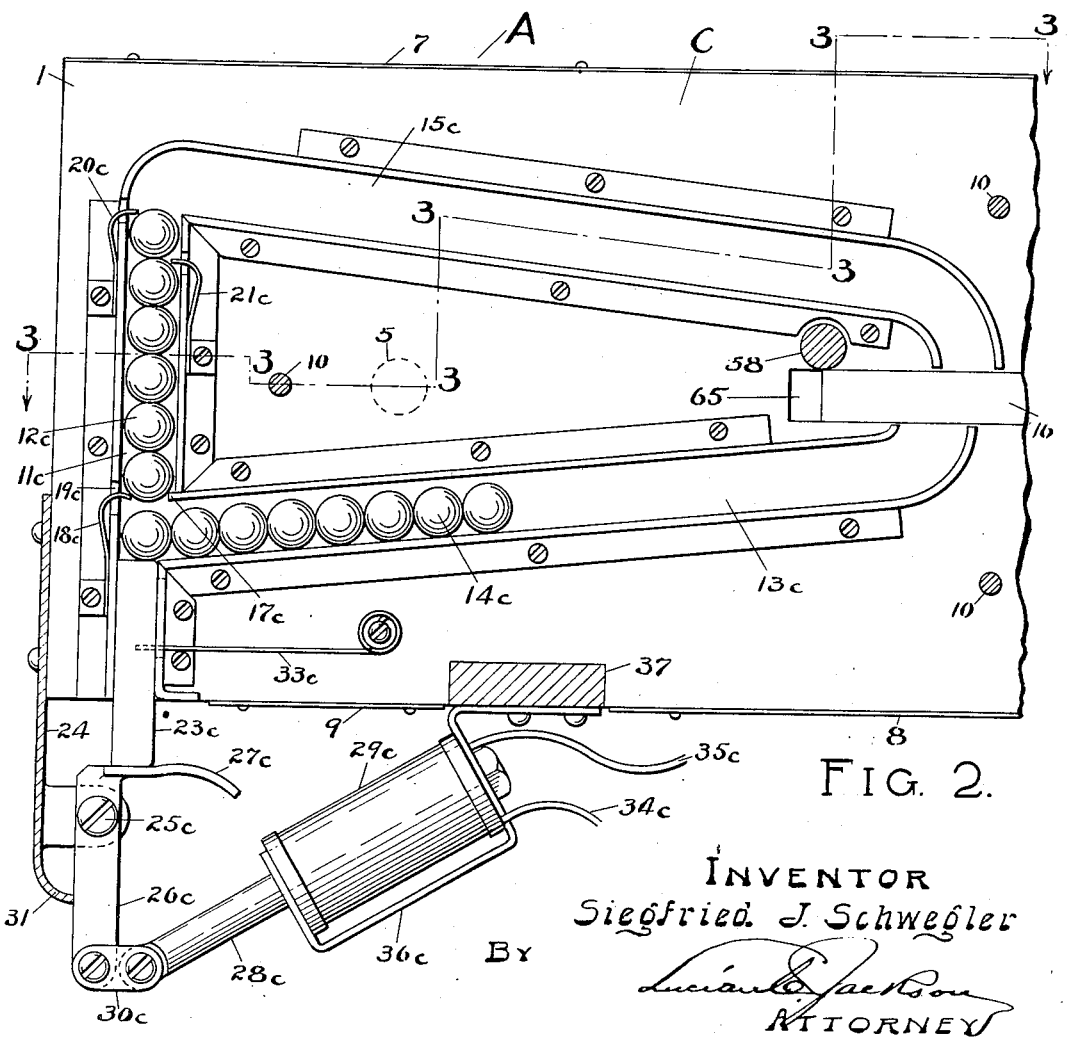
INVENTOR
Siegfried J. Schwegler
BY
ATTORNEY Dec. 26, 1933.  S. J. SCHWEGLER  1,941,191
PREPAYMENT METER
Filed Feb. 11, 1932  4 Sheets-Sheet 3

INVENTOR
Siegfried J. Schwegler
BY
Lucian E. Jackson
ATTORNEY.

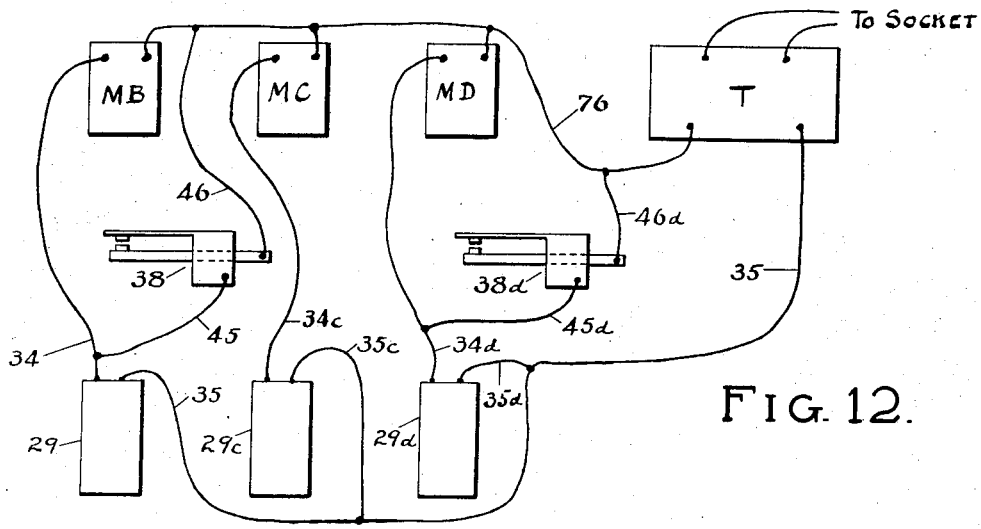
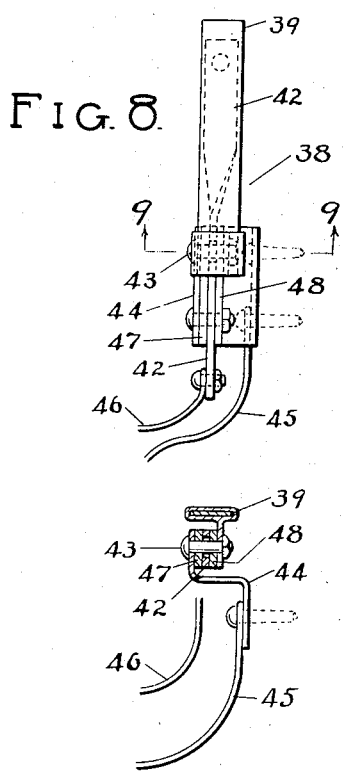
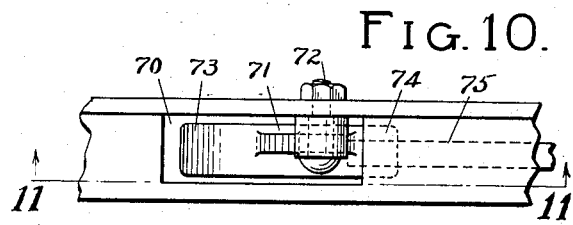
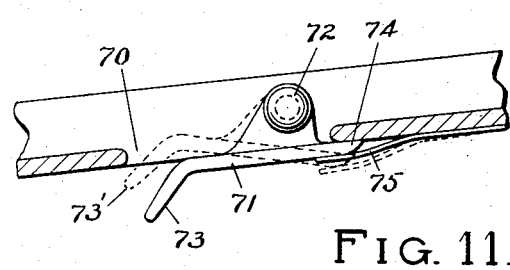

Patented Dec. 26, 1933

1,941,191

UNITED STATES PATENT OFFICE 1,941,191

PREPAYMENT METER

Siegfried J. Schwegler, Buffalo, N. Y.

Application February 11, 1932. Serial No. 592,298

15 Claims. (Cl. 194—6)

This invention relates to a meter to operate a piano, a radio, or other instrument started by said meter on depositing a coin to close a circuit and stopped at end of record or tune paid for, or to any picture machine or other device, as a turnstile, to which it can be applied.

In conjunction with the prepayment meter a coin box is provided to close an electric circuit upon the depositing of a coin in said box. The closing of said circuit acts to operate the prepayment meter and the prepayment meter operates to start the player instrument connected therewith. In the case of a player instrument which has a moving part, said moving part operates said prepayment meter at the end of a record and thus stops said player instrument. A turnstile is unlocked by the meter and the meter operated by movement of the turnstile. Where the instrument, as a radio, has no moving part a timer is provided to operate the meter and stop said radio.

Reference is made to my co-pending patent application on a Radio timer, Ser. No. 455,312, filed May 24, 1930.

When one player instrument is used in a central location to furnish entertainment for those in several different rooms or in separate booths, said rooms or booths are each equipped with earphones or a loud speaker and connected to said player instrument. A coin box in each booth or room furnishes means for operating said player instrument through a prepayment meter when a coin is deposited in said coin box.

Reference is made to my Patent No. 1,833,724, issued Nov. 24, 1931, which provides for the storing of means for automatically playing more than one record upon the depositing of more than one coin at a time. Each coin, however, being of the same denomination.

The object of the present invention is to provide a prepayment meter which is an improvement on my patented meter above referred to, in that it provides for the use of coins of different value and the operation of an instrument in accordance with the value of such coins.

With this object in view, the invention consists in certain features of novelty in the construction, combination and arrangement of parts by which the said object and certain other objects which will hereinafter appear are attained, the invention being more particularly pointed out in the claims.

In the drawings accompanying and forming a part of this specification,

Fig. 2 is an elevation of the central portion of my meter, on the line 2—2 of Fig. 3, showing the runways and the balls which are operated upon the payment of one or more five cent pieces, but with an outside view of the escapement. This portion of the meter is essentially the same as in my patent above referred to except for improved details.

Fig. 3 is a top view of my meter partly in section on line 3—3—3—3—3—3—3 of Fig. 2.

Fig. 8 is a top view of the switch shown in the lower side of the upper ball runway of Fig. 1.

Fig. 9 is an end view of said switch and partly in section on line 9—9 of Fig. 8.

Fig. 10 is a top view of a portion of the upper side of the upper ball runway and the ball stop lever of Fig. 1.

Fig. 11 is a side elevation of ball stop lever and partly in section on line 11—11 of Fig. 10.

Fig. 12 is a wiring diagram for my meter showing connections between money boxes, solenoids and switches to a source of power.

Figure 1:
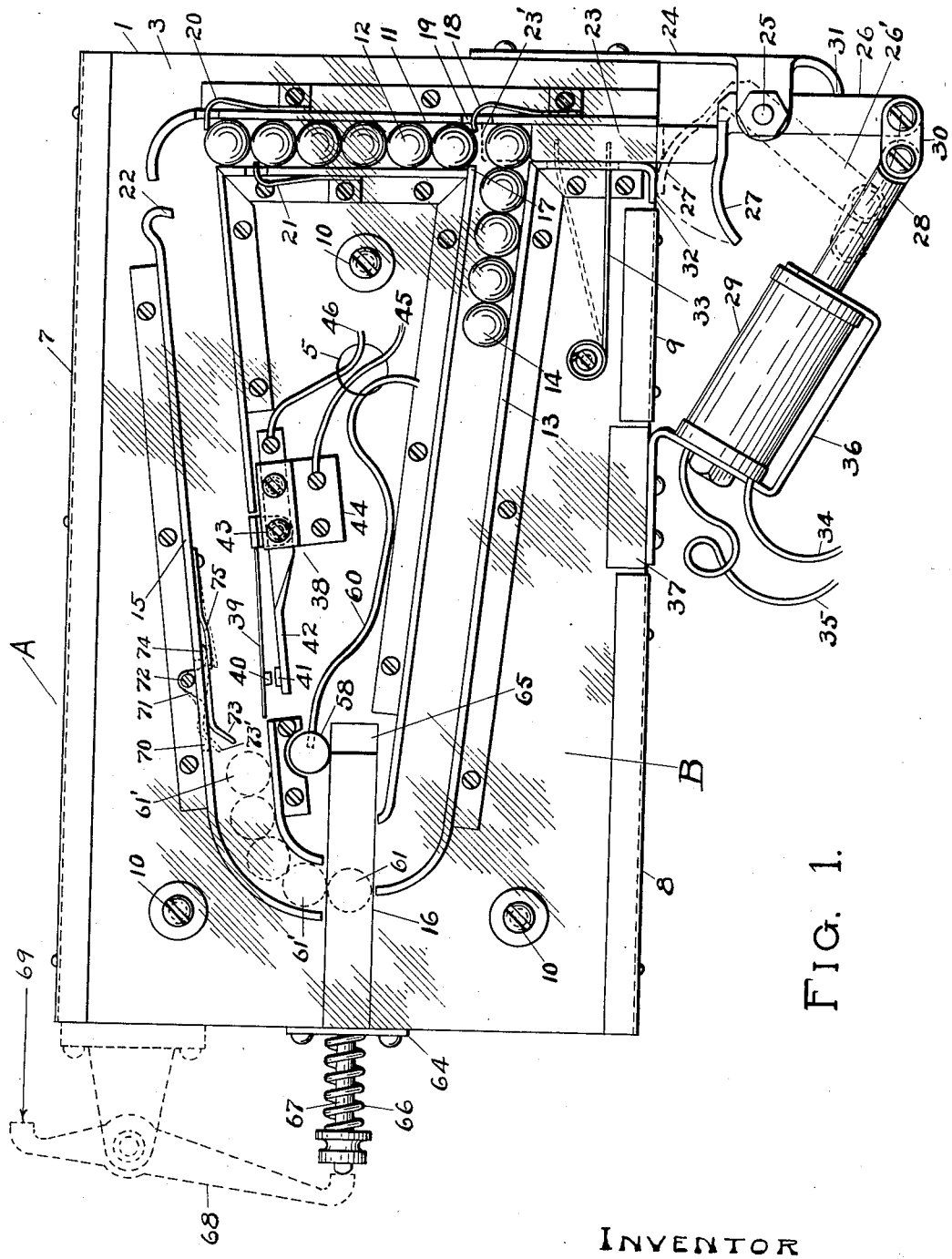
Figure 1 is a front elevation of my improved meter having a glass front and showing the five balls in the lower runway which will be transferred to the vertical runway upon the payment of twenty-five cents.
Figure 4:
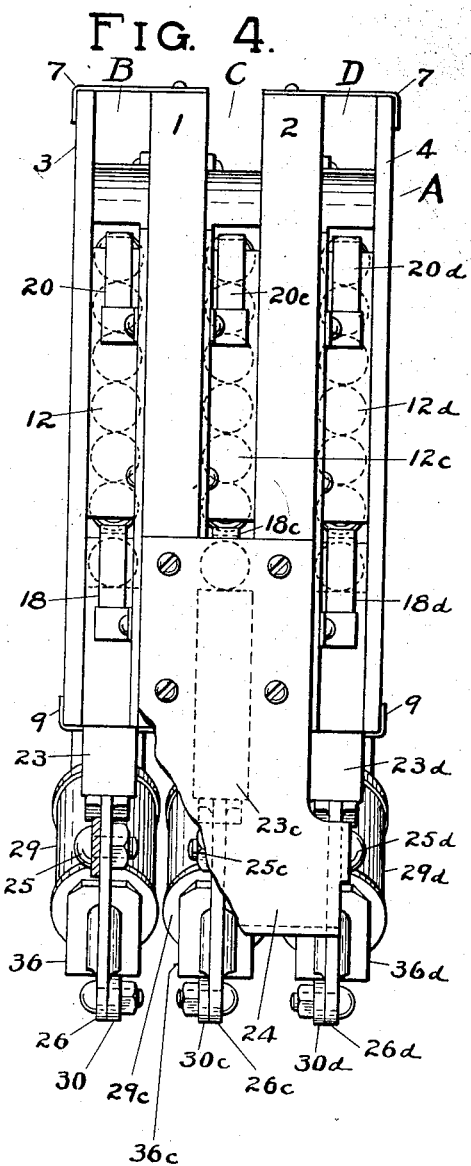
Fig. 4 is an end elevation of my meter with a supporting plate and the solenoid stop partly in section.

In the form of my invention as illustrated by the figures, A is the complete meter. The meter A is built up of two wood panels 1 and 2 with the ball runways formed of angle shaped material and fastened to said panels, but said panels and runways can be formed of stampings or any desired material so the insulating and conducting parts are in proper relation to each other. 3 is a glass front and 4 a glass back having holes 5 and 6 respectively, for cables, and held in place against the front and back runways by means of upper clips 7 and 7 fastened to the tops of panels 1 and 2 respectively and lower clips 8, 8 and 9, 9 fastened to the bottoms of panels 1 and 2. The panels 1 and 2 are fastened together by means of the screws 10, 10 and 10.

The mechanism in Fig. 1 showing the front of my meter, is identical with the mechanism at the back, except the angles forming the runways at the back are so-called "lefts" if the front angles are called "rights", (see Fig. 3). The only difference being in the operation by supplying two balls in the lower runway for the back and connecting to a dime money box. So a description of the parts in Fig. 1 will suffice for that of the back.

11 is a vertical runway for a column of balls 12. 13 is a lower horizontally inclined runway for holding a row of balls 14 which are fed one at a time up into the lower end of vertical runway 11 by the operation of the meter, while 15 is an upper horizontally inclined runway to receive the balls discharged one at a time from the upper end of said vertical runway 11 and conduct them into an escapement 16.

The column of balls 12 is supported by means of a projection 17 on the inside of runway 11 and a spring 18 extending through slot 19 opposite said projection 17. Near the top of runway 11 is a flat spring 20 extending over the top ball of column 12. When the column of balls 12, which fills vertical runway 11, is raised by a ball 14 entering the bottom of said runway 11 to discharge the top ball into upper runway 15, the spring 20 is retracted by the passing of said top ball and immediately assumes its normal position as shown to prevent the second top ball from also being discharged at the same time. As a further means of checking the momentum of the remaining balls in the column 12, a spring 21 is provided extending over the second top ball. 22 is a lip depending from the upper side of runway 15 for checking the speed of a ball discharged into said runway 15 and causing it to start rolling more slowly toward the escapement 16, for a purpose to be later explained under operation.

23 is a plunger to raise the lowest ball 14 in runway 13 up into runway 11, said ball 14 retracting the spring 18 in passing and then being supported between the projection 17 and spring 18. 24 is a plate fastened to the end of meter A to furnish a supporting pivot 25 for the cam link 26. The upper or horizontal cam portion 27 of cam link 26 supports plunger 23 and has a downward curving end or cam shape to raise plunger 23 to 23' when link 26 moves to 26' and 27 moves to 27' by the operation of the shaft 28 in the solenoid 29. 30 is a connecting link between shaft 28 and cam link 26.

31 on plate 24 is a stop for cam link 26 when in its normal position as shown in Fig. 1 and 32 is a stop for cam 27 when raised to position 27' and plunger 23 is raised to 23'. A spring 33 is provided to positively return plunger 23' to 23 and in so doing return 27' to 27 and 26' to 26. The solenoid 29 operates its shaft 28 longitudinally in the usual manner when an electric circuit 34—35 is completed. 36 is a flat strip of metal fashioned to enclose both ends of solenoid 29 and form a bracket to support said solenoid in the proper position below meter A by means of the cross piece 37 inset into the wood panels 1 and 2.

38 is a switch to be operated by a ball rolling down runway 15. The lower side or ball track of runway 15 is cut away to allow of the insertion of switch 38, the movable arm of which is a spring 39 to be depressed by the weight of a ball while passing over it. When spring arm 39 is depressed, contact is made between the contact point 40 on 39 and the contact point 41 on the stationary arm 42 completing an electric circuit 45—46 through the spring arm 39, bolt 43, bracket 44 to cable 45 and through the stationary arm 42 and cable 46. The stationary arm 42 is insulated from the bracket 44 by insulation 47 and from the spring arm 39 by insulation 48.

Figure 5:
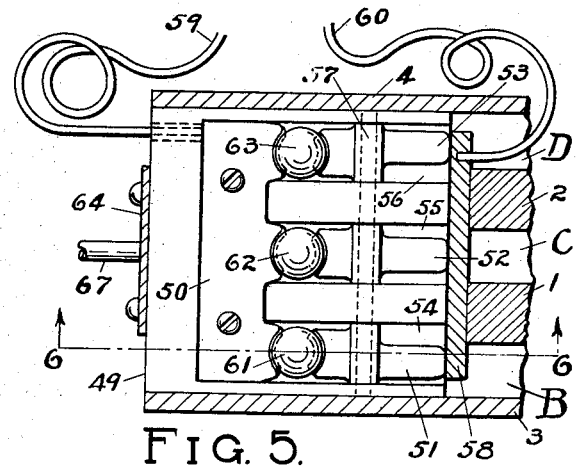
Fig. 5 is a top view of the slide and its mechanism, which comprises an escapement for the balls, and with the portion of the meter surrounding it partly in section, as shown by the line 5—5 in Fig. 6.
Figure 6:
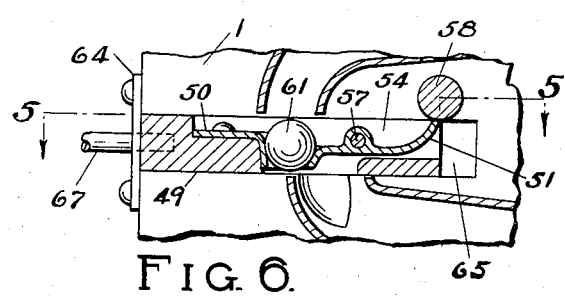
Fig. 6 is a side elevation of the escapement in section and a portion of the meter in section on line 6—6 of Fig. 5.
Figure 7:
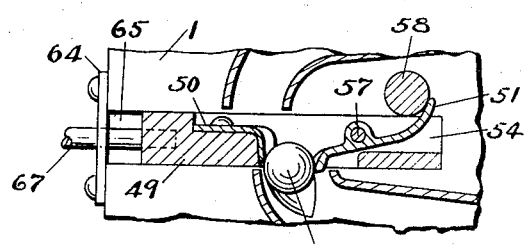
Fig. 7 is a sectional elevation the same as in Fig. 6 but with the escapement at the end of its travel.

The escapement 16 shown in detail in Figs. 5, 6 and 7 is composed of a slide 49, a contact plate 50, conductor levers 51, 52 and 53 in slots 54, 55 and 56. Levers 51, 52 and 53 are mounted on a pivot pin 57 in said slide 49. 58 is a carbon conductor rod with which each of the levers 51, 52 and 53 make contact to complete an electric circuit between the cable 59 attached to plate 50 and the cable 60 attached to rod 58. Circuit 59—60 is complete when a ball 61, 62 or 63 is in place between said plate 50 and said levers 51, 52 or 53. The plate 50 has inclined surfaces to wedge said ball 61, 62 or 63 between said plate 50 and the adjacent inclined end of conductor levers 51, 52 or 53.

The cable 60 connected to conductor rod 58 is shown in Fig. 5, for illustration, near cable 59 but in Figs. 1 and 3 is shown connected at the opposite end of said rod 58 and passing through hole 5 in glass front 3.

64 is a plate fastened over the end of guideway 65 in which the escapement 16 has a limited forward and backward movement for carrying any of the balls 61, 62 or 63 which may be in said escapement 16 from the position shown in Fig. 6 to the position shown in Fig. 7. In the position shown in Fig. 7 any contained ball is discharged into its appropriate lower runway to break the circuit of cables 59 and 60, and the escapement 16 returned to the position in Fig. 6 under the influence of coiled springs 66 (Fig. 1) on a stud 67 which passes through plate 64 and is fastened into slide 49.

Dotted lever 68 represents a means of connection between the player or timer for a radio (not shown) and the meter A whereby the movement of said lever 68 in the direction of arrow 69 will operate escapement 16 to discharge ball 61, 62 or 63 to break electric connection in circuit 59—60 and stop player or radio. In place of the lever 68 any electrical operating device can be used.

The four stored balls in runway 15 above the first ball 61 in escapement 16 are referred to as 61'. As a means of preventing a rolling ball in runway 15 from rebounding from a stored ball and again operating switch 38, and more particularly to prevent anyone from jarring the meter A to throw back a stored ball and again operating said switch 38, a stop lever 71 is provided. 70 is a slot in the upper side of runway 15 for said stop 71. Lever 71 is pivoted on screw 72 and has a depending arm 73 which is raised to position 73' by the passing of a ball. A shorter arm 74 bears against the under part of the upper side of runway 15 when lever 71 is in its normal position to prevent the return of a ball to switch 38. The weight of arm 73 will hold lever 71 in its normal stop position but a spring 75 is provided bearing against arm 74 to assist in returning arm 73 to normal stop position and to prevent jarring it from said position.

The front portion of the meter as shown in Fig. 1 is referred to as B and is to be connected by means of solenoid 29 to a twenty five cent money box MB; the center portion of the meter as shown in Fig. 2 is referred to as C and is adapted to be connected by means of solenoid 29c to a five cent money box MC; while the back portion of the meter is referred to as D and is adapted to be connected by means of solenoid 29d to a dime money box MD.

The runways in the center C are "lefts", the same as the runways of D, in relation to the runways of B, as referred to at the beginning of the description (see Fig. 3). The mechanism shown in Fig. 2 for C is therefore identical with that of B and D except that no switch (as 38 in Fig. 1) or ball stop lever (as 71 in Fig. 1) or speed check lip (as 22 in Fig. 1) is provided. Also the number of balls 14c in lower runway 13c is not limited to any particular number.

The parts of center C are indicated in the drawings as having the same numbers as those of the front portion B in Fig. 1 with the addition of letter c while the parts of the back portion D where shown are indicated in like manner with the addition of the letter d.

Referring first to the front or B portion of the meter and the wiring diagram, the operation is as follows:

A twenty five cent piece being dropped into money box MB an electric circuit from a transformer T is completed through wiring 76, 35 and 35 to operate solenoid 29 which raises plunger 23 and the ball 14 resting on it. The upward movement of ball 14 retracts spring 18 and raises the column of balls 12 when said spring 18 returns to normal position and together with projection 17 holds the column of balls 12 as in Fig. 1. The lifting of column 12 forces the upper ball past upper spring 20 into runway 15 and the second ball past spring 21 where it is held between springs 21 and 20. The discharged ball in runway 15 is first checked in its forward motion by lip 22, then rolls down runway 15 depressing arm 39 as it rolls over it to bring together contacts 40 and 41 of switch 38 and lodges in the escapement 16 in the position of ball 61, shown in Figs. 5 and 6. Ball 61 then completes a circuit 59—60 and starts the musical instrument to which said circuit is connected.

In the mean time the closing of switch 38 by the rolling ball completes a circuit 76, 46, 45, 34, 35 to again operate solenoid 29 to discharge a second ball into runway 15 which in turn closes switch 38 to discharge a third ball and so on until the five balls in runway 13 have been lifted into vertical column 12 and five balls have been discharged into runway 15. The fifth ball will close switch 38 to operate the solenoid 29 a sixth time but there being no more balls in lower runway 13 to be lifted, no more balls will be discharged into runway 15. The last four balls 61' discharged into runway 15 are stored above ball 61 in the escapement 16 and provide for the playing of the instrument four more times after the completion of the first time.

The checking of the speed of each ball by lip 22 when discharged into upper runway 15 has two objects. One object is to give more time between the closing of electric circuit from money box MB to solenoid 29 and the closing of electric circuit from switch 38 to solenoid 29 to allow all parts of the ball mechanism and the balls 14 to properly function than would be possible if discharged ball was shot swifty down runway 15. Another object is to allow time for the weight of discharged ball to depress spring arm 39 and operate switch 38.

When the connected instrument has completed the tune or music represented by five cents, the instrument or connected timer moves the lever 68 in the direction of the arrow 69 and pushes the escapement 16 to the position shown in Fig. 7 when the ball 61 drops into runway 13 breaking the 59—60 circuit to stop the instrument. The spring 66 returns escapement 16 to the position shown in Fig. 6 when the stored balls 61' each in turn make contact in the escapement 16 to operate the playing instrument.

The electric circuit represented by 59—60 is connected to a battery or plugged into another electric circuit and is not shown in connection with the wiring diagram of Fig. 10.

The operation of the D or back portion of the meter is the same as that of the B or front portion, except that only two balls are in the lower runway and a money box MD is provided for the depositing of a dime to close circuit 76, 34d, 35d, 35 to solenoid 29d and the first of two balls is discharged into the upper runway to roll into the escapement 16 in the position of ball 63 for the running of the instrument. The second ball is discharged into upper runway as a result of the first ball operating switch 38d to close circuit 76, 46d, 45d, 34d, 35d and 35.

The operation of the C or central portion of the meter as shown in Fig. 2 is to deposit a five cent piece in money box MC to complete circuit 76, 34c, 35c and 35 to solenoid 29c and discharge a ball into upper runway 15c from where it takes the position of ball 62 in escapement 16 to play the instrument only once. Each tune can be paid for as wanted or additional balls can be stored above ball 62 in runway 15c by the depositing of a five cent piece for each such additional ball stored and for the playing of the instrument an equal number of additional times. Thus, if it is desired to have the instrument play three or four times in succession, a like number of five cent pieces can be deposited one after the other and at one time in money box MC. When a dime is the change available, it will pay for two records by depositing it in money box MD or where a twenty five cent piece is the change available it will pay for five records by depositing it in money box MB.

It will be understood that other portions could be added to the meter similar in construction to the front B portion to provide for the use of other coins as a fifty cent piece or a one cent piece and by providing the necessary money boxes.

In referring to number of times an instrument is played or the number of records, it is assumed that the cost of playing a record is five cents, so the coin of unit value is a five cent piece and the other coins as a dime and a twenty-five cent piece are multiples of said five cent piece and referred to as coins of multiple unit value. Where a timer is used as with a radio the increments of time also are assumed to be paid for on a basis of five cents as a unit of value. Another unit of value could be used but each ball represents the unit of coin value.

Where the number of records to be prepaid at one time cannot be covered by a dime or a twenty five cent piece, payment in the meter as shown must be made by five cent pieces.

Having thus described my invention what I claim is:

1. In a prepayment meter the combination, of separate operating portions, each of said portions having mechanism actuated by a coin of different value to close an electric circuit to its respective portion a ball operated switch in one portion to actuate its said mechanism, each of said portions including connected ball runways, balls in said runways, an escapement in said runways, means operated by said coin closed electric circuit to discharge a ball into said escapement and said means in one portion again operated by a ball operating said switch, means in said escapement to contact with said discharged ball to complete an electric circuit and operate an instrument, and means to move said escapement and release said ball from said contacting means and break said instrument electric circuit.

2. In a prepayment meter the combination, of separate mechanisms actuated by separate electric circuits and each of said circuits closed by a coin of different value, a ball operated switch in the mechanism actuated by a coin of multiple value each of said mechanisms including a runway for balls comprising a vertical section, an upper inclined section, a lower inclined section, balls in said lower section, a column of balls to the top of said vertical section, means to support said column of balls, means actuated by said coin controlled circuit to raise a ball from said lower section into said vertical section and discharge a ball into said upper section, said discharge ball in the multiple coin value mechanism to again actuate said means an escapement for receiving the ball from the upper section, means in said escapement to contact with said discharged ball and complete an electric circuit, means to operate said escapement and means to permit the contacting means to release said ball into said lower section and open said electric circuit.

3. In a prepayment meter the combination, of separate mechanisms actuated by separate coin controlled electric circuits, each circuit actuated by a coin of different value and each of said mechanisms operating an instrument according to the value of its actuating coin, a ball operated switch in the mechanism actuated by a coin of multiple value each of said mechanisms including a runway for balls comprising a vertical section, an upper inclined section, a lower inclined section, balls in said lower section, a column of balls to the top of said vertical section, means to support said column of balls, spring check means to allow discharge of one ball at a time from said column, means to raise a ball from said lower section into said vertical section and discharge a ball into said upper section, and said means actuated by a ball operating said switch to raise a following ball in the multiple coin value mechanism an escapement common to the separate mechanisms for receiving a ball from each of the upper sections, separate ball compartments in said escapement for each runway, contact means in each compartment to contact with a discharged ball from its corresponding upper section and complete an electric circuit common to said compartments to operate an instrument, means to move said escapement and release any discharged ball from said contacting means into its lower section to break the electric circuit to stop said instrument.

4. In a prepayment meter the combination, of separate mechanisms for the operation of an instrument, each separate mechanism actuated by a coin of different value to close an electric circuit to its respective mechanism, said instrument operated once for each coin of unit value deposited, said instrument operated once for each unit value of a coin of multiple unit value deposited, each of said mechanisms including a runway for balls comprising a vertical section, an upper inclined section, a lower inclined section, balls in said lower section, a column of balls to the top of said vertical section, means to support said ball column, means actuated by said coin controlled circuit to raise a ball from said lower section into said vertical section and discharge a ball into said upper section, an escapement for receiving a ball from the upper section, means in said escapement to contact with said discharged ball and complete an electric circuit to said instrument, means to operate said escapement and release said ball to break said electric circuit to said instrument and means in the upper section of the mechanism actuated by a coin of multiple value including a switch operated by a ball passing through said upper section to close an electric circuit to operate said ball raising means and raise an additional ball into said vertical column and discharge an additional ball into said upper section.

5. In a prepayment meter the combination, of separate operating portions each portion actuated by a coin of different value to close a circuit to its respective portion, one of said portions actuated by a coin of unit value and one of said portions actuated by a coin of multiple unit value, each of said portions including a runway for balls comprising a vertical section, an upper inclined section, a lower inclined section, balls in said lower section, the number of balls in the lower section of the portion actuated by the coin of multiple value limited to the number of units of value in said coin, a column of balls filling said vertical section, means to support said column of balls, electrically controlled means for raising a ball from the lower section into the vertical section and discharging a ball into the upper section, an escapement between said upper and lower sections to receive a discharged ball from said upper section, means in said escapement to contact with said discharged ball and complete an electric circuit, means to operate said escapement and release said ball to break said circuit, switch means in the upper section of the portion actuated by a coin of multiple value and a ball stop lever in said upper section, said ball raising means for the latter portion actuated first by said multiple value coin to discharge a ball into said upper section and said discharged ball operating said switch in said upper section to again actuate said ball raising means and discharge another ball into said upper section until all balls in the lower section have been raised into the vertical section and the number of balls corresponding to the multiple unit value of the coin discharged into said upper section.

6. In a prepayment meter the combination, of three separate operating portions for the operation of an instrument, the first of said portions actuated by a five cent coin closing an electric circuit to said first portion, a second portion actuated by ten cent coin closing an electric circuit to said second portion and a third portion actuated by a twenty five cent coin closing an electric circuit to said third portion, each of said portions including a runway for balls comprising a vertical section, an upper inclined section, a lower inclined section, balls in said lower section, the number of balls in the lower section of the second portion limited to two balls and the number of balls in the lower section of the third portion limited to five balls, a column of balls to the top of said vertical section, means to support said column of balls, electrically controlled means for raising a ball from the lower section into the vertical section and discharging a ball into the upper section, an escapement between said upper and lower sections to receive a discharged ball from said upper section, means in said escapement to contact with said discharged ball and complete an electric circuit, means to operate said escapement and release said ball to break said circuit, switch means in the upper section of the second portion and of the third portion, and ball stop means between each of said switch means and said escapement, said ball raising means for the first portion actuated only by a five cent coin deposited in a money box, the number of balls discharged into said upper section corresponding to the number of five cent coins deposited at one time, said ball raising means for the second and third portions first actuated by depositing in its money box a ten or twenty five cent coin to discharge a ball into the upper section of said second or third portions respectively and said discharged ball again actuating its corresponding ball raising means by operating its switch until all of the balls in its lower section are raised into its vertical section and an equal number discharged into its upper section.

7. In a prepayment meter, a runway for balls comprising a vertical section, an upper inclined section, a lower inclined section, a ball operated switch in said upper inclined section, a row of balls in said lower section, a column of balls filling said vertical section, means to support said column of balls, check means allowing discharge of but one ball at a time from said column, coin controlled electric means for raising a ball from said lower section into said column to discharge the top ball into the upper section, said discharged ball operating said switch to again actuate said ball-raising means, said latter means including a plunger and a cam shaped link to raise said plunger, an escapement between said upper and lower sections to receive said discharged ball from said upper section and return it into said lower section, means in said escapement to contact with said discharged ball and complete an electric circuit, means to operate said escapement and means to permit the contacting means to release said ball and open said circuit.

8. In a prepayment meter containing a number of balls in connected runways as a means of closing an electric circuit through said balls one at a time and storing the number of said balls represented by the number of units of value in a single prepaid coin to automatically close said circuit, a runway for balls comprising upper and lower inclined sections, a connecting vertical section, balls in said lower section, a column of balls to the top of said vertical section, means to support said column of balls, electrically operated means for raising a ball from said lower section into said column to discharge the top ball into the upper section, means in said upper section to check the speed of said discharged ball, circuit means closed by a coin of multiple unit value to operate said ball raising means, the number of balls in said lower section corresponding to the units of value of said coin, an escapement between said upper and lower sections to receive said discharged ball from said upper section, means in said escapement to contact with said ball to complete a circuit, means to operate said escapement and release said ball to break said circuit, switch means in the upper section operated by said discharged ball to again actuate said ball raising means and discharge another ball into said upper section, each discharged ball in turn operating said switch to actuate said ball raising means and discharge a following ball into said upper section until all of the balls in said lower section have been raised into the vertical section and means in said upper section to prevent a discharged ball from returning and operating said switch a second time.

9. In a prepayment meter, a runway for balls comprising a vertical section, a lower inclined section, an upper inclined section, balls in said lower section, a column of balls filling said vertical section, electrically operated means for raising a ball into said vertical section to discharge a ball into said upper section, instrument circuit means between said upper and lower sections, contact means in said circuit closed by said discharged ball, means to release said ball from discharged ball, means to break said circuit, circuit means closed by a coin to actuate said ball raising means, and a switch in said upper section operated by a passing ball to close another circuit to said ball raising means, said coin closed circuit actuating said ball raising means to discharge the first ball into said upper section and said switch closed circuit actuating said ball raising means to discharge a following ball into said upper section.

10. In a prepayment meter the combination, of connected runways, balls in said runways, a switch in one of said runways, means actuated by the deposit of a coin for controlling the movement of the balls in one direction through said runways and closing said switch by a passing ball for again actuating said means, an escapement, means in said escapement to complete an electric circuit with a ball and means to move said escapement to release said ball and break said circuit.

11. In a prepayment meter the combination, of connected runways through which balls can be moved in rotation in one direction only, balls in said runways, a switch in one of said runways, means for controlling the movement of the balls through said runways one at a time and actuated first by the deposit of a coin and again by a passing ball closing said switch, instrument circuit means with contacts to be closed by a ball and means to release said ball from said contacts and break said circuit.

12. In a prepayment meter the combination, of connected runways through which objects can be moved successively in one direction, objects in said runways, a switch in one of said runways, means actuated by the deposit of a coin for controlling the movement of said objects through said runways and closing said switch by a passing object for again actuating said means, stop means to prevent the return of an object to again close said switch, an instrument circuit closed by each of said objects in turn and means to discharge said object and break said circuit.

13. In a prepayment meter the combination, of connected runways through which objects can be moved successively, objects in said runways, mechanism actuated by the deposit of a coin of multiple unit value to discharge an object, an instrument circuit closed by each of said objects in turn, means to discharge said object from said instrument circuit and break said circuit and object actuated means for closing a circuit to again actuate said mechanism to discharge a following object and deliver the number of objects to said instrument circuit corresponding to the number of units of value in said coin.

14. In a prepayment meter the combination, of a runway for balls, balls in said runway, means for moving said balls in one direction through said runway, a switch in said runway having a flexible member depressed by a passing ball to close said switch means to check the speed of a ball before reaching said switch and means to prevent the return of said ball to said switch.

15. In a prepayment meter the combination, of separate portions for carrying objects in a cycle of operations, mechanism in each portion for controlling the movement of said objects, object actuated means in each portion having mechanism actuated by a coin of multiple unit value, the mechanism of each portion actuated to discharge the number of objects corresponding to the number of units of value in each coin deposited, each of said mechanisms actuated by the deposit of a coin to discharge an object and each mechanism again actuated by the discharged object operating the object actuated means in each multiple unit portion to discharge the balance of the number of objects to equal the number of units of value in the coin, an instrument circuit closed by a discharged object and means to discharge said object and break said circuit.

SIEGFRIED J. SCHWEGLER.